June 11, 1935.   A. A. HORTON   2,004,282
DRIVING MECHANISM FOR CALCULATING MACHINES
Filed March 19, 1930   4 Sheets-Sheet 1

INVENTOR
Allen A. Horton
BY Rector, Hibben, Davis, & Macauley
ATTORNEYS

June 11, 1935.  A. A. HORTON  2,004,282
DRIVING MECHANISM FOR CALCULATING MACHINES
Filed March 19, 1930   4 Sheets-Sheet 2
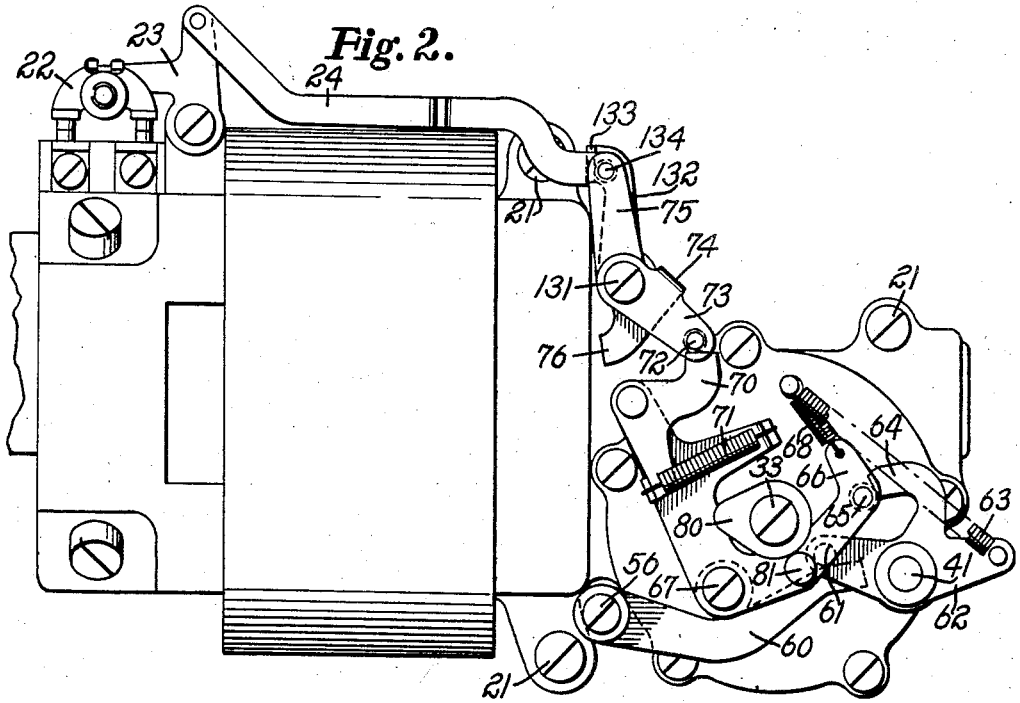
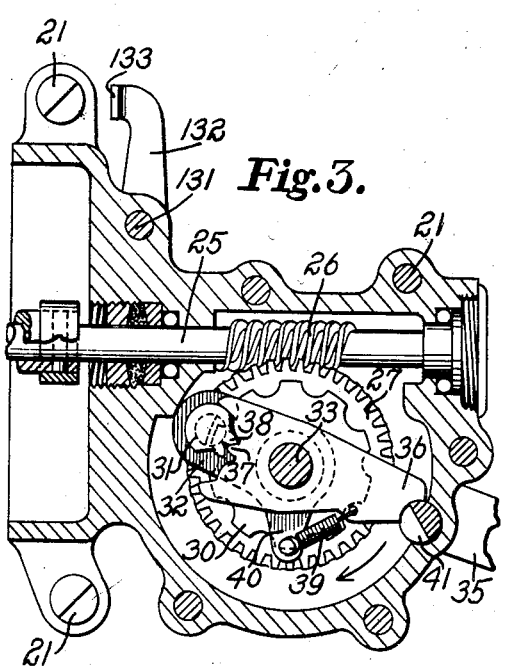
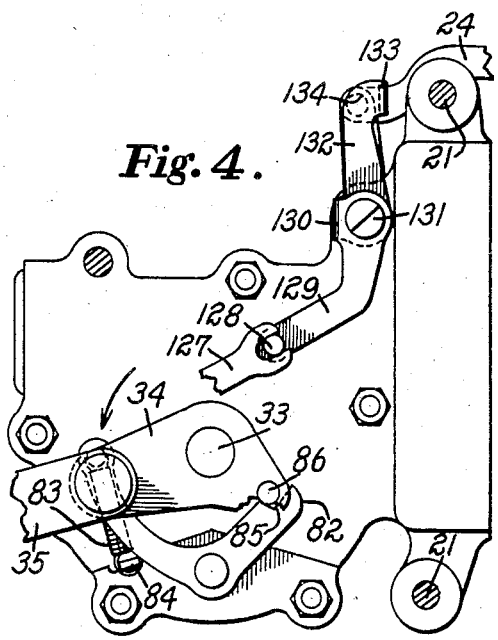
INVENTOR
Allen A. Horton
BY
Rector, Hibben, Davis, & Macauley
ATTORNEYS

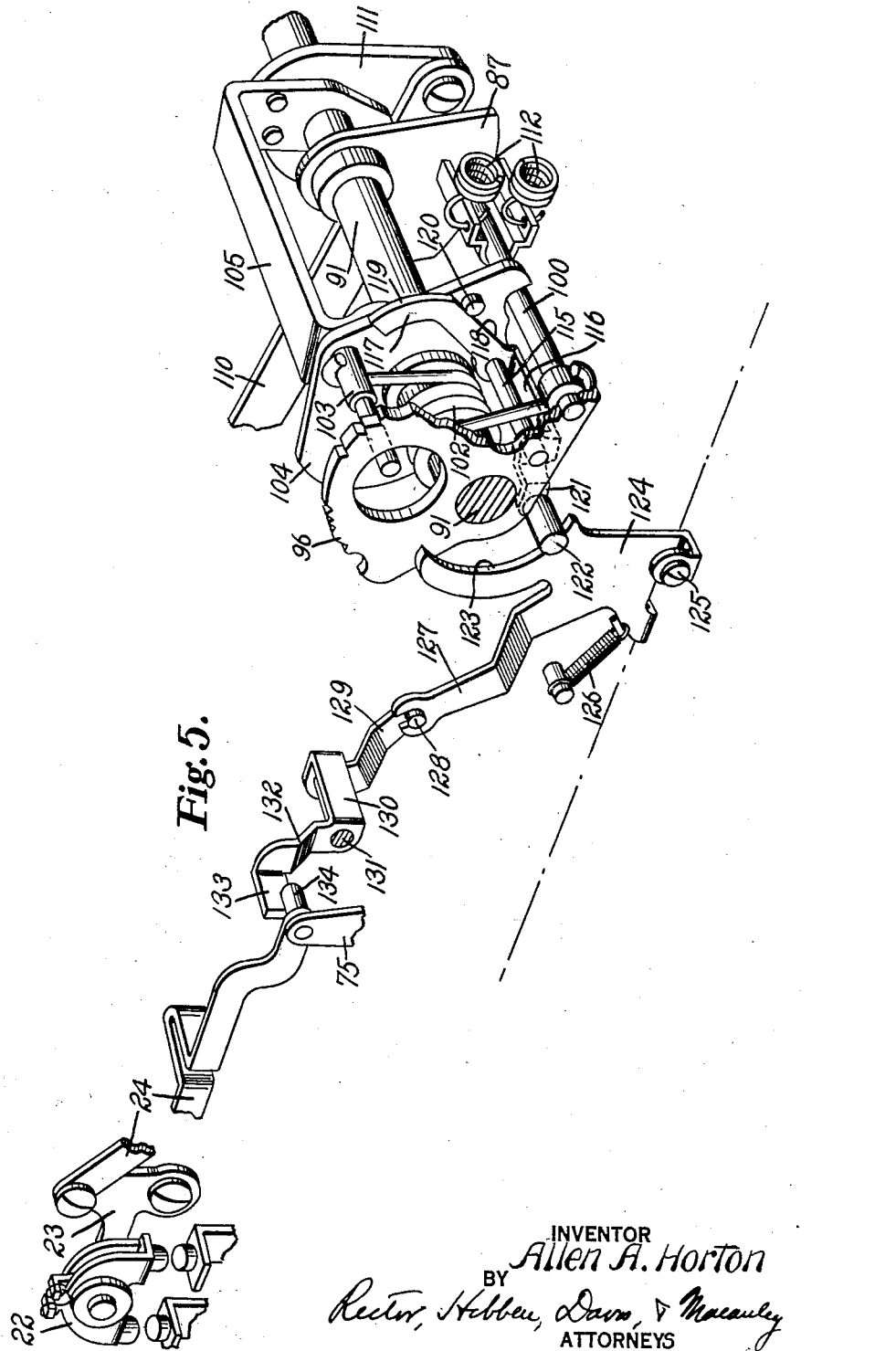

June 11, 1935.  A. A. HORTON  2,004,282
DRIVING MECHANISM FOR CALCULATING MACHINES
Filed March 19, 1930    4 Sheets-Sheet 4

INVENTOR
Allen A. Horton
BY
Rector, Hibben, Davis, & Macauley
ATTORNEYS

Patented June 11, 1935

2,004,282

UNITED STATES PATENT OFFICE 2,004,282

DRIVING MECHANISM FOR CALCULATING MACHINES

Allen A. Horton, Plymouth, Mich., assignor to Burroughs Adding Machine Company, Detroit, Mich., a corporation of Michigan Application March 19, 1930, Serial No. 436,931

8 Claims. (Cl. 235—62)

This invention relates to a driving mechanism for calculating machines.

For satisfactory operation, a calculating machine should be operated at a given uniform speed. When machines are motor driven an effort is made to secure this result by providing the motors with governors for regulating their speed. One of the difficulties with governors, particularly where the motor is not run continuously, is that the governor does not have time to function owing to the fact that the motor quickly gives the machine only a single stroke of operation and then stops.

The resistance to driving offered by calculating machines varies in accordance with the number of keys that have been depressed and the function that is to be performed. Universal motors are generally employed which will operate on either direct or alternating current. The starting torque and the acceleration as well as the speed may vary in accordance with the nature of the current and voltage supply. In order that a machine may be operated with its heaviest load, the motor must have enough power to drive this heaviest load no matter what the current or voltage supply, but this power may be entirely too much for lighter loads or for other supplies of current and voltage. All these factors make it difficult to obtain a uniform speed of operation of a calculating machine under all conditions.

The present invention is directed to a solution of this problem and it comprehends providing a mechanism that will automatically regulate the driving force exerted on the machine.

Accordingly, the general object of the invention is to provide an improved driving mechanism for calculating machines.

A more particular object is to provide a driving mechanism that will be automatically controlled so as to operate the calculating machine at a uniform speed under varying conditions.

Other objects and advantages of the invention will appear from the specification and drawings.

An embodiment of the invention is shown in the accompanying drawings in which;

Fig. 2 is a partial left-side elevation of the driving mechanism with the clutch controls tripped for operation.

Fig. 3 is a partial left-hand sectional elevation of the clutch employed in connection with the driving mechanism.

Fig. 4 is a right-side elevation of a portion of the driving mechanism.

Fig. 5 is a perspective view of the principal parts of the automatic control for governing the action of the driving mechanism.

Figure 1:
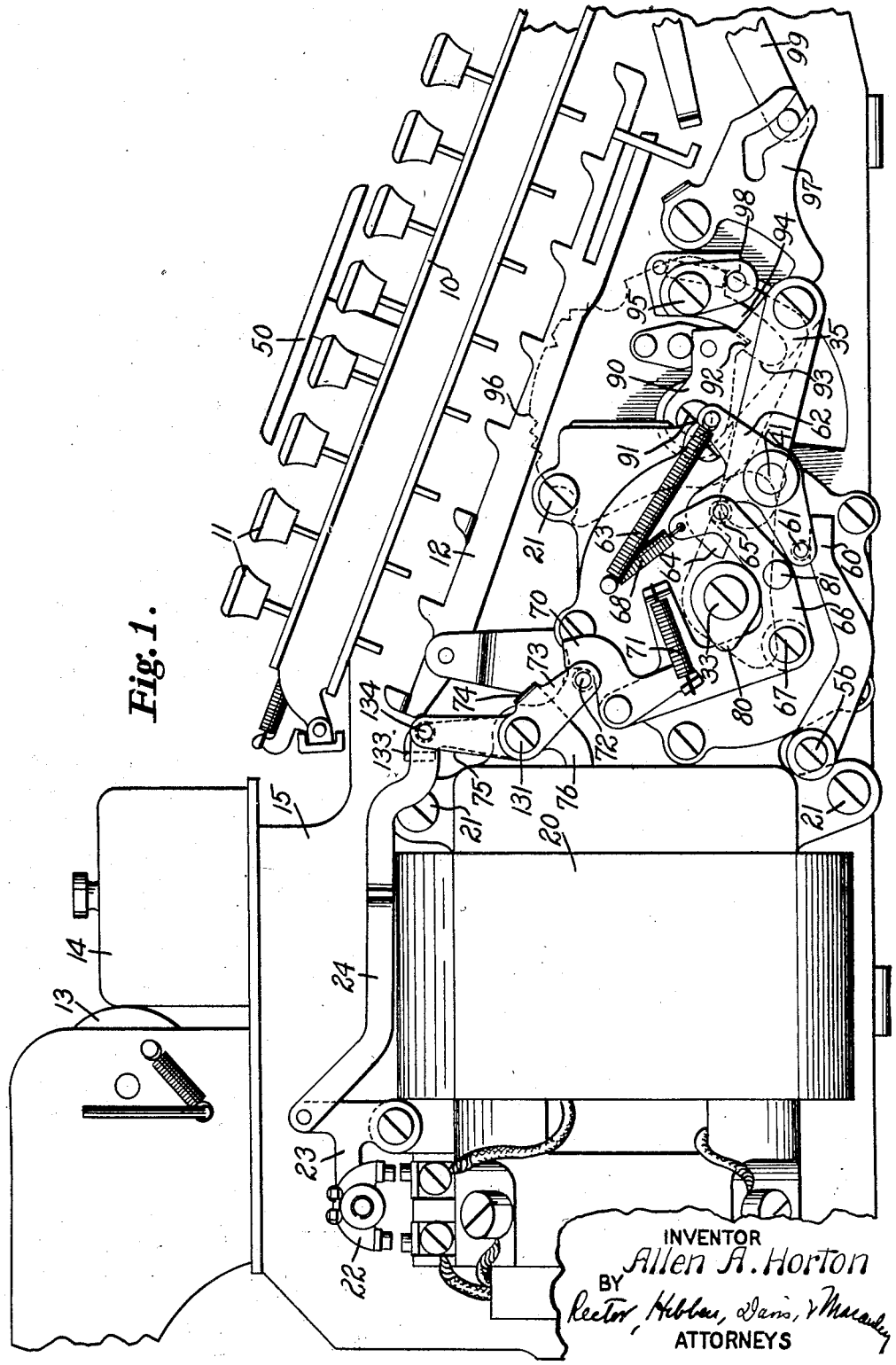
Figure 1 is a partial left-side elevation of a calculating machine with the driving mechanism applied thereto, the casing being omitted so as to show the parts more clearly.

The invention is shown applied to the well-known Burroughs portable calculating machine which has been on the market for a number of years. While the invention is useful with this machine it can be used with equal facility on other makes of machines and it is to be understood that the particular calculating machine shown is for purposes of illustration only.

Only a portion of the calculating machine is shown. For example, in Fig. 1 a keyboard 10 is illustrated having keys 11 that control differential stop bars 12. In the upper left-hand corner is shown a platen 13 and a housing 14 for one of the ribbon spools of the machine. A side plate 15 forming part of the frame of the machine also acts as a support for the driving mechanism of the present invention.

Motor

The power operated means for driving the machine is preferably a small electric motor which may be either alternating or direct current as desired.

Referring to Fig. 1, an electric motor 20 is detachably secured to the side plate 15 by the screws 21. The motor is controlled by an electric switch 22 on the end of a pivoted arm 23 controlled by a link 24. The switch controls the supply of current to the motor. It is shown in open position in Fig. 1 and in closed position in Fig. 2.

The armature shaft 25 (Fig. 3) carries a worm 26 meshing with a worm gear 27 that drives the clutch that will now be described.

Clutch

In order that the machine may be disconnected from the motor a suitable clutch is provided as follows:

The worm gear 27 which is rotated by the electric motor is rigidly connected with a driving clutch member 30 in the form of a notched disk. Mounted to cooperate with the notches of this disk is a stub shaft 31 having a portion of semi-circular cross-section, said shaft being journaled in the end of an arm 32 fixed to a shaft 33. The shaft 33 has a crank arm 34 fixed to it as shown in Fig. 4 which crank arm is connected to a pitman 35 that drives the calculating machine through connections that will presently be described.

The clutch is controlled by a lever 36 journaled loosely on shaft 33 and provided with a single tooth 37 meshing with teeth 38 on a portion of the stub shaft 31. The lever 36 is urged clockwise by a spring 39 one end of which is connected to the lever and the other end to an extension 40 of the arm 32. The lever 36 is controlled by a semi-circular shaft 41 which, when it is in the position of Fig. 3, prevents the lever 36 from moving under the influence of its spring 39 whereas, if the shaft 41 is turned clockwise slightly the lever is freed. The operation of the clutch is as follows:

When the parts are in the position of Fig. 3, the semi-circular portion of shaft 31 is in such a position that it clears the edge of the notched disk 30 and the disk may rotate freely without imparting any movement to arm 32. If, however, the shaft 41 is turned so as to free the lever 36, the spring 39 immediately rocks the lever clockwise and it, in turn, rocks the semi-circular shaft 31 counterclockwise to cause it to engage in one of the notches in the driving clutch disk 30. This connects the arm 32 to the disk 30 and, when the latter rotates, the arm rotates with it to rotate the shaft 33.

Under normal conditions the clutch is disengaged after the shaft 33 has been given a single revolution. As the shaft 33 and arm 32 rotate, the lever 36 moves with them owing to the spring connection 39 between said lever and the arm 32. As a rotation is completed the lever 36 arrives at its Fig. 3 position where it is blocked by the shaft 41 which, under normal conditions, is returned to its Fig. 3 position after having been moved to release lever 36. Blocking of lever 36 causes the shaft 31 to be rocked clockwise out of engagement with the driving clutch disk 30 thereby disengaging the clutch.

*Starting devices*

The motor is normally at rest and the clutch disengaged. Accordingly, when it is desired to operate the machine, the motor must be started and the clutch thrown into engagement.

Figure 6:
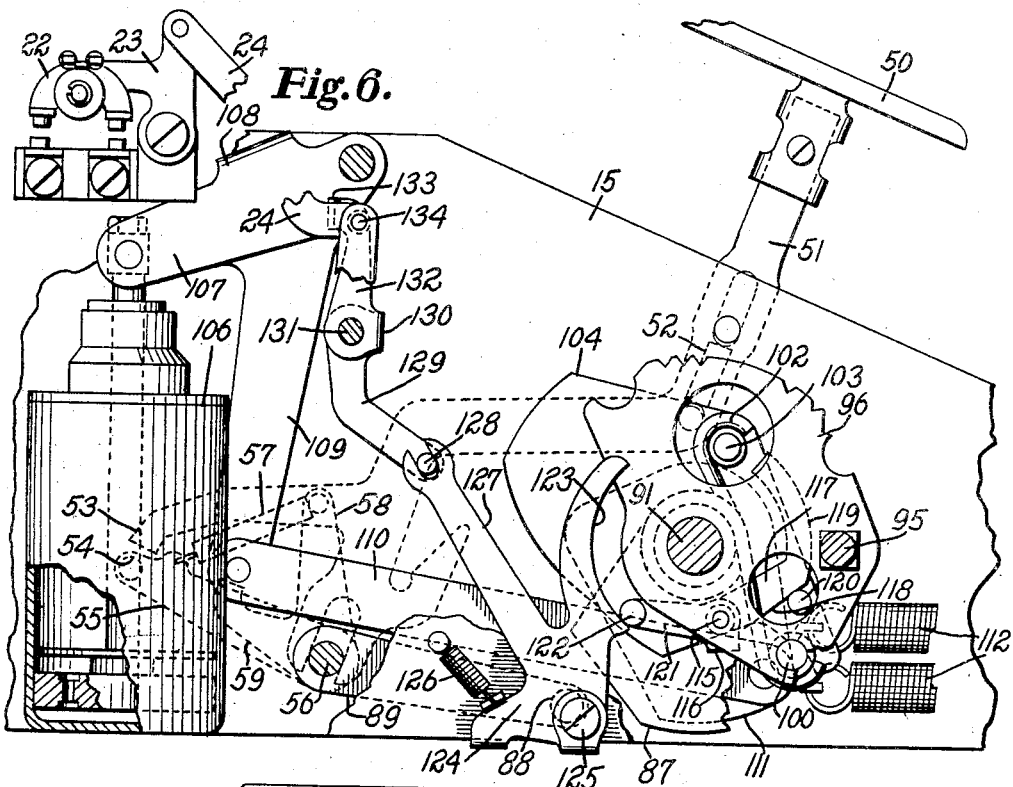
Fig. 6 is a left-side elevation of the driving mechanism with the parts shown in normal position, the motor and some portions of the drive being omitted to show other portions more clearly.
Figure 7:
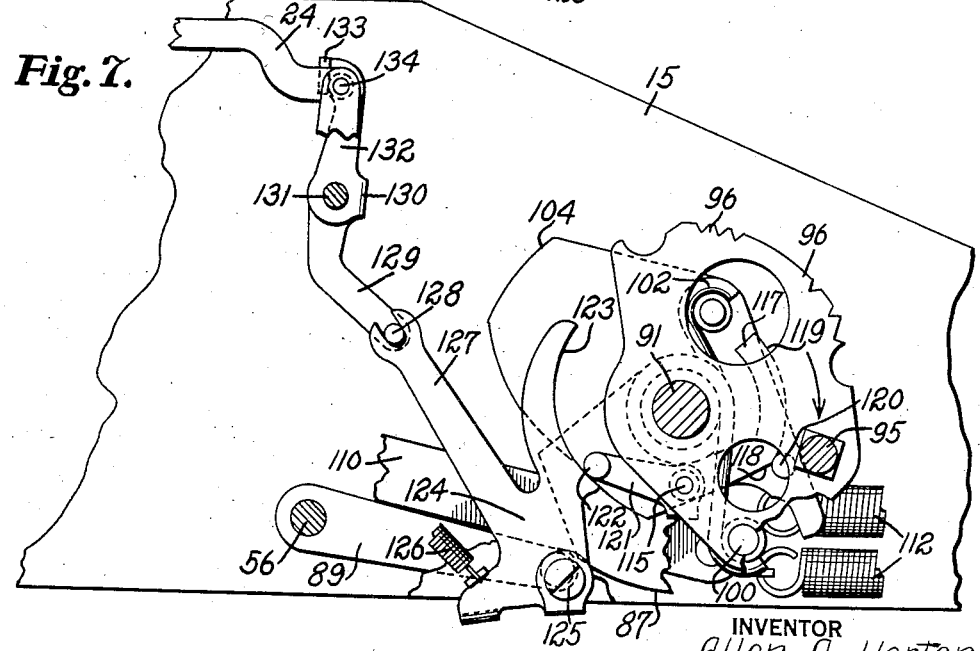
Fig. 7 is a partial left-side elevation showing the automatic governing mechanism in operating condition.

These results are accomplished by depressing a starting bar 50 best illustrated in Fig. 6. This bar has a stem 51 to which a spring 52 is connected, the spring acting to urge the starting bar upward to normal position. The lower end of the stem of the motor bar is of irregular shape and it has a projection 53 adapted to engage a stud 54 on an arm 55 journaled loosely on a shaft 56. The arm 55 is connected by a spring 57 to one arm 58 of a bell crank lever fixed to the shaft 56, the other arm 59 of said bell crank lever extending adjacent the arm 55 and having a lateral lug extending over said arm. The spring 57 provides a yielding connection between the motor bar 50 and the shaft 56, depression of the motor bar acting through said spring to rock the shaft 56 counterclockwise as viewed in Fig. 6.

Referring to Fig. 1, the shaft 56 has fixed to it an arm 60 whose outer end is positioned to engage a stud 61 on a three-armed lever 62 fixed to the shaft 41 and urged counterclockwise by a spring 63. One arm of this three-armed lever has a curved end 64 that is adapted to engage over a stud 65 on a bell-crank lever 66 pivoted at 67 and urged counterclockwise by a spring 68. Pivoted on the end of the lever 66 is a bell-crank pawl 70 urged counterclockwise by a spring 71. One of the arms of this bell-crank pawl 70 normally engages a stud 72 on one arm 73 of a yoke 74 whose other arm 75 is connected to the link 24, controlling the motor switch.

The normal position of the parts is that shown in Fig. 1 where the spring 63 urges the three-armed lever 62 counterclockwise to hold shaft 41 in its Fig. 3 position where it blocks lever 36. Curved arm 64 locks the bell crank lever 66 in position and the spring 71 acting on pawl 70 urges the yoke 74 clockwise to hold the switch in open position, the yoke having an extension 76 limiting against the motor housing.

The operation of the parts described when starting the motor and giving the machine a stroke of operation is as follows:

Assume that the parts are in the position shown in Fig. 1. As the motor bar 50 is depressed the arm 60 is rocked counterclockwise toward its Fig. 2 position by means of the connections explained. As this arm moves it rocks the three-armed lever 62 clockwise and this rocks the shaft 41 clockwise from its Fig. 3 position so as to release the lever 36. When released the lever 36 is moved clockwise by its spring 39 and this rotates the shaft 31 which causes an engagement of the clutch by rocking the semi-circular portion of shaft 31 into the path of the notches of the driving clutch member 30. The motor is thus connected to the driving mechanism for actuating the machine.

As the three-armed lever 62 moves toward its Fig. 2 position, the hooked arm 64 moves from over the stud 65 on the bell crank lever 66. This releases the latter which is thereupon rocked counterclockwise by its spring 68 from its Fig. 1 to its Fig. 2 position. As this occurs the end of spring pressed pawl 70 moves under the stud 72 on the arm 73 and the tension of the spring 71 acts to rock the yoke 74 counterclockwise which pushes the link 24 to the left as viewed in Fig. 1 to close the switch 22 to start the motor.

In normal operations it is desirable to disengage the clutch and stop the motor after the calculating machine has been given one stroke of operation and for this purpose the shaft 33 is provided with a cam 80 illustrated in Figs. 1 and 2. This cam normally occupies the position of Fig. 1. When the shaft 33 has made about three-quarters of a revolution, the cam nose engages a stud 81 on the bell crank lever 66, and rocks the lever back to its Fig. 1 position. As soon as the end of the spring pressed pawl 70 passes from under the stud 72, the pawl snaps over the stud to its Fig. 1 position and acts to rock the yoke 74 clockwise to open the switch 22. Also, as soon as the stud 65 on lever 66 passes the end of the curved arm 64 of the three-armed lever 62, the spring 63 rocks said three-armed lever counterclockwise to its Fig. 1 position thereby disconnecting the clutch.

In order that the clutch disk 30 may not move backward after a revolution is completed, a latch 82 is provided which cooperates with the crank 34 attached to shaft 33 as shown in Fig. 4. This latch is urged counterclockwise by a spring 83 into engagement with a lug 84. It has a shoulder 85 adapted to engage a stud 86 on crank 34. As the crank 34 rotates counterclockwise in Fig. 4 it passes the latch at the end of a revolution and the shoulder 85 passes under stud 86 to block accidental return movement of arm 34 which might cause an engagement of the clutch.

The operating arm 60 is positively restored to normal shortly after the machine starts to operate by means of a cam 87 (Fig. 6) that rocks clockwise and returns counterclockwise as the machine is operated. This cam has a raised portion adapted to engage a stud 88 on an arm 89 fixed to shaft 56. When the parts are in normal position such as shown in Fig. 6 the arm 89 with its stud 88 may move counterclockwise because a cut-away portion of cam 87 is opposite stud 88. As the machine starts to operate the raised portion of cam 87 engages stud 88 and rocks arm 89 clockwise which restores the shaft 56 to normal and assists the spring 52 to return the motor bar to normal.

If the motor bar 50 should be held depressed, the cam 87 moves the arm 89 with its shaft 56 as previously explained but, in such event, the spring 57 yields which allows movement of shaft 56 and arms 58—59 without moving the motor bar 50. With the motor bar held down, as soon as the machine has been given a stroke of operation, the stud 88 on arm 89 is freed and the spring 57 immediately acts to move shaft 56 by means of the arm 58 to starting position to cause the motor to again operate the machine. This allows the machine to be operated continuously as long as the motor bar is held depressed.

Driving connections

The clutch acts to drive the calculating machine through connections as follows:

The pitman 35 which is driven by crank 34, is connected to an arm 90 (Fig. 1) journaled loosely on the end of the main drive shaft 91 of the machine. This arm has a shoulder 92 adapted to engage the hooked end 93 of a pawl 94 pivoted on a stud 95 carried by a full stroke sector 96 that is fixed to the main drive shaft 91. This connection between the pitman and the full stroke sector through pawl 94 forms a disconnectible connection by means of which the machine may be automatically disconnected from the motor drive when the machine is not properly conditioned for operation. Disconnection is effected by means of a pivoted member 97 having a hooked end adapted to engage an abutment 98 on the pawl 94 to rock the pawl out of engagement with the shoulder 92. The member 97 is controlled by an arm 99 which, in turn, is controlled by other parts of a calculating machine not shown, the control being such that, when the machine is not properly conditioned for operation, the member 97 engages abutment 98 as the machine starts to operate and disengages pawl 94 from the arm 90 thereby disengaging the machine from the motor drive before any damage can be done. An understanding of the details of this portion of the machine is not necessary in the present case, such details being disclosed in the machine on the market and in the Horton Patent No. 1,853,050.

Automatic control

In order to govern the motor so that the machine will be operated at the proper speed and with the requisite force, provision is made for controlling the motor automatically by the movements of the calculating machine.

Referring to Fig. 5, the full-stroke sector 96, which is fixed to the main drive shaft 91, has securely fixed thereto a pin or rod 100 that projects a substantial distance across the machine. Bearing against the pin 100 is one end of a torsion spring 102 whose other end bears against a pin 103 on a cam plate 104 that is journaled loosely on the main drive shaft 91. The cam plate 104 is connected by a yoke 105 to a plate 111 also journaled loosely on the main drive shaft. The cam 104, its yoke 105, and plate 111 serve to actuate the mechanism of the calculating machine, the drive to the cam 104 being through the spring 102 as follows:

The main drive shaft 91 is rocked clockwise as viewed in Fig. 5 by the motor or by a hand crank. As the drive shaft rocks clockwise the pin 100 acting through the torsion spring 102 tends to rock the cam plate 104 with it. The strength of the spring is such that the cam 104 normally moves with the full stroke sector 96. The operation of the calculating machine is retarded by the load that may be put on it by the function it is called upon to perform. It is also retarded by a dash pot 106 (Fig. 6) to the piston of which is connected one arm 107 of a bell crank yoke member 108 whose other arm 109 is connected by a link 110 to a plate 111 (Fig. 5) fixed to the yoke 105. The dash pot prevents the calculating mechanism from being moved too rapidly and it also prevents jerky and irregular motion.

When the operating means of the machine is released at the end of its forward stroke, it is returned by the restoring springs 112 connected to the pin 100 carried by the full stroke sector 96.

The full stroke sector 96 is provided with a pin 115 on which is loosely journaled a yoke 116. This yoke has one arm 117 provided with a straight surface 118 and a curved surface 119. The straight surface 118 normally engages a stud 120 on the cam plate 104 that operates the calculating mechanism. The yoke has another arm 121 carrying a stud 122 adapted to engage a cam surface 123 on a member 124 pivoted at 125 to the left side frame and urged clockwise by a spring 126. The member 124 has an upwardly extending arm 127 provided with a slotted end engaging over a stud 128 on one arm 129 of a yoke 130 pivoted at 131 to the motor casting. This yoke has another arm 132 provided with a lateral lug 133 positioned behind a stud 134 on the link 24 which controls the motor switch 22.

In normal operations of the machine the cam plate 104 moves with the full stroke sector 96 and the two may be considered to move as a unit. Under these conditions the yoke 116 remains in its Fig. 5 position, being urged into contact with the stud 122 by the tension of spring 126 acting on the member 124.

If, however, the driving force should be greater than required, owing to its sudden application or to a too high speed or acceleration of the motor, the torsion spring 102 will yield allowing the full stroke sector 96 to move ahead of the cam disk 104. The pin 115 with its yoke 116 moves bodily with the full stroke sector, such movement being clockwise relative to the cam 104 in Fig. 5. This causes the yoke 116 to be rocked counterclockwise as viewed in Fig. 5 by the stud 120 and cams the member 124 counterclockwise, thereby rocking the yoke 130 clockwise to pull the link 24 to the right to open the motor switch. The opening of the switch cuts off the energy supply to the motor and the speed of the motor then dies down and allows the cam 104 to catch up with the full stroke sector 96. As soon as this occurs the motor switch is again closed, the parts above described moving back to normal. The switch is closed by the action of spring 71 which is tensioned when the switch is opened as above described. This yielding connection in the switch control enables the same switch to be used both as a starting switch and as a speed regulating switch.

In this manner the speed of the motor is automatically regulated by the resistance of the calculating machine. If the motor tends to move ahead too fast its circuit is opened until its speed is reduced to the desired amount. If the motor acts too suddenly, its circuit is opened and the calculating machine given a chance to catch up. The driving force applied to the calculating machine is thus automatically kept substantially constant. In practice, the motor circuit is often opened and closed quite rapidly to give just the proper motor regulation for constant speed and power.

I claim:

1. In combination, a calculating machine, an electric motor for driving the same, a circuit for said motor, a normally open switch controlling said circuit, a depressible motor bar, means operated by depression of said motor bar for placing a spring tension on said switch to close the same, and means operating automatically as said machine is operated for reversing the direction of action of said spring tension to cause it to open said switch.

2. In combination, a calculating machine, an electric motor for driving the same, a circuit for said motor, a switch in said circuit, a depressible motor bar, a member carrying a spring pressed pawl normally exerting a force on said switch tending to hold said switch open, means operated by depression of said motor bar for moving said member to change the position of said pawl so that its spring exerts a force on said switch to close the same, and means operating automatically as the calculating machine is operated to move said member to again change the position of said pawl so that its spring exerts a force on said switch tending to open the same.

3. In combination, a calculating machine, a motor for driving the same, a power supply circuit for said motor, driving connections between said motor and calculating machine including two members movable angularly relative to one another and joined by a yieldable connection arranged to maintain a predetermined relative angular position between said members and means governed by relative angular movement between said members as said calculating machine is operated by said motor acting automatically to open and close said circuit to maintain the speed of said motor substantially constant.

4. In combination, a calculating machine, an electric motor for driving the same, driving connections between said motor and calculating machine permitting relative movement between said motor and machine, a switch for said motor, means for closing the switch to start the motor including a spring tension device urging the switch to closed position when said closing means is in switch-closing position, and automatic means responsive to the relative speeds of operation of said calculating machine and said motor for automatically opening said switch against the tension of said device, said automatic means having portions permitting said spring tension device to again close the switch when the speed of the motor and the calculating machine are substantially the same.

5. In combination, a calculating machine, power operated driving means therefor, a source of power for said latter means, driving connections between said driving means and said calculating machine, said connections involving a pair of elements angularly movable relatively to each other, means for maintaining said elements in a predetermined angular position, and automatic means governed by relative angular movement between said elements from said predetermined position, acting to interrupt the supply of power to said power operated means, said automatic means also acting to reconnect said power to said power operated means upon resumption of the predetermined relative position between said elements.

6. In combination, a calculating machine, an electric motor for driving the same, a circuit for said motor, driving connections between said motor and calculating machine, said connections involving a pair of elements movable about a common axis and displaceable angularly relatively to each other, and automatic means responsive to predetermined relative angular displacement between said elements to automatically open and close said motor circuit to maintain the speed of said motor substantially constant.

7. In combination, a calculating machine subject to varying operative loads, power operated driving means for imparting cycles of operation to said machine, a source of power for said driving means, driving connections between said driving means and said calculating machine, a manual switch for controlling the power to said driving means during each cycle of operation, and automatic means governed by said calculating machine in accordance with variations in relative speeds of said machine and said driving means during each cycle of operation for controlling said switch so as automatically to maintain a substantially constant driving force on said calculating machine.

8. In combination, a calculating machine subject to varying loads, an electric motor for driving the same, driving connections disposed between said motor and said calculating machine and including driving and driven elements and a yieldable driving member therebetween for transmitting the drive, and automatic means actuated upon yielding movements of said yielding member in response to variations in resistance to operation of said machine by said motor, for controlling said motor automatically to maintain a substantially constant effective driving effort on said calculating machine.

ALLEN A. HORTON.